(12) United States Patent
Hollinger (10) Patent No.: US 9,720,714 B2
(45) Date of Patent: *Aug. 1, 2017

(54) ACCELERATOR FUNCTIONALITY MANAGEMENT IN A COHERENT COMPUTING SYSTEM

(71) Applicant: International Business Machines Corporation, Armonk, NY (US)

(72) Inventor: Michael C. Hollinger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/836,516

(22) Filed: Aug. 26, 2015

(65) Prior Publication Data

US 2017/0060607 A1 Mar. 2, 2017

(51) Int. Cl.
 *G06F 9/455* (2006.01)
 *G06F 9/50* (2006.01)
 *G06F 13/42* (2006.01)

(52) U.S. Cl.
 CPC ...... *G06F 9/45508* (2013.01); *G06F 9/45533* (2013.01); *G06F 9/5016* (2013.01); *G06F 13/4282* (2013.01)

(58) Field of Classification Search
 None
 See application file for complete search history.

(56) References Cited

U.S. PATENT DOCUMENTS

| 7,127,601 B2* | 10/2006 | Cheon | G06F 9/4411 713/1 |
| 7,369,657 B2* | 5/2008 | Eldeeb | G06F 21/72 380/28 |
| 8,838,674 B2* | 9/2014 | D'Amora | G06F 9/5044 709/203 |
| 2008/0222396 A1* | 9/2008 | Spracklen | G06F 21/71 712/220 |
| 2013/0227556 A1* | 8/2013 | Tsirkin | G06F 21/53 718/1 |
| 2014/0101306 A1* | 4/2014 | Murgia | H04L 47/125 709/224 |

(Continued)

OTHER PUBLICATIONS

List of IBM Patents or Patent Applications Treated as Related.
(Continued)

*Primary Examiner* — Kenneth Tang
(74) *Attorney, Agent, or Firm* — Matthew C. Zehrer (57) ABSTRACT

A coherent computer system includes a memory shared by a processor and a coherent accelerator device (CAD). The memory includes a work queue directly accessible by the accelerator functional unit (AFU) within the CAD and by the processor utilizing the same effective addresses. The coherent computer system provides accelerator functionality when the accelerator is unavailable by implementing a virtual AFU to carryout accelerator function while the AFU is unavailable. The virtual AFU is a functional logical equivalent of the AFU and is coherent with the processor. When the AFU becomes available, the virtual AFU is disabled and the accelerator is enabled to allow the accelerator to carryout accelerator functionality.

10 Claims, 7 Drawing Sheets

(56) References Cited

U.S. PATENT DOCUMENTS

| | | | | |
|---|---|---|---|---|
| 2015/0089495 A1* | 3/2015 | Persson | ............... | G06F 9/45533 |
| | | | | 718/1 |
| 2015/0100972 A1* | 4/2015 | Dube | .................... | G06F 9/4881 |
| | | | | 719/319 |
| 2015/0293775 A1* | 10/2015 | Persson | ............... | G06F 9/45558 |
| | | | | 718/1 |
| 2015/0317275 A1* | 11/2015 | Arroyo | ............... | G06F 9/45558 |
| | | | | 710/105 |
| 2016/0217101 A1* | 7/2016 | Johns | .................. | G06F 9/44505 |

OTHER PUBLICATIONS

Stuecheli, J., et al., "CAPI: A Coherent Accelerator Processor Interface," IBM J. Res. & Dev. vol. 59 No. 1 Paper 7 Jan./Feb. 2015.
Wile, B., "Coherent Accelerator Processor Interface (CAPI) for POWER8 Systems Decision Guide and Development Process," Oct. 20, 2014.
Wile, B., "Coherent Accelerator Processor Interface (CAPI) for POWER8 Systems White Paper," Sep. 29, 2014.

* cited by examiner

ACCELERATOR FUNCTIONALITY MANAGEMENT IN A COHERENT COMPUTING SYSTEM

FIELD OF THE INVENTION

Embodiments of the invention generally relate to computer systems and more particularly to enabling accelerator functionality in a coherent computing system when the accelerator is unavailable.

DESCRIPTION OF THE RELATED ART

Heterogeneous computing systems combine different types of compute elements that share memory. A specific class of heterogeneous systems pairs traditional general-purpose processing cores and accelerator units. While this arrangement enables significant gains in application performance, device driver overheads and operating system code path overheads can become prohibitive. The I/O interface of a processor chip is a well-suited attachment point from a system design perspective, in that standard server models can be augmented with application-specific accelerators. However, traditional I/O attachment protocols introduce significant device driver and operating system software latencies.

The Coherent Accelerator Processor Interface (CAPI) enables attaching an accelerator as a coherent CPU peer over the I/O physical interface. The CPU peer features consist of a homogeneous virtual address space across the CPU and accelerator and hardware-managed caching of this shared data on the I/O device. This attachment method greatly increases the opportunities for acceleration due to the much shorter software path length required to enable its use compared to a traditional I/O model. The term "coherent" in the context of the present document means that the accelerator and CPU(s) can both access system memory directly and with the same effective addresses.

The accelerator may become unavailable in various instances. For example, the accelerator is unavailable while accelerator function logic is being loaded to the accelerator. The accelerator may also become unavailable when transitioning from a previous function (e.g., encryption, etc.) to a new function (e.g. compression, etc.). Presently, there is a need for effectively enabling accelerator functionality when the accelerator is unavailable.

SUMMARY

In an embodiment of the present invention, a coherent computer system includes a memory shared by a processor and a coherent accelerator device (CAD). The memory includes a work queue directly accessible by the CAD and the processor utilizing the same effective addresses. The processor includes an application and a CAD virtual machine (CAD VM) emulating the CAD while the CAD is unavailable. The work queue is directly accessible by the CAD VM and the processor utilizing the same effective addresses.

In yet another embodiment, a method of enabling accelerator functionality in a coherent computer system when an accelerator functional unit (AFU) is unavailable includes loading, with the CAD, AFU logic to the AFU and reading the AFU logic descriptor to determine whether the loaded AFU logic is a most recent version, implementing, with the processor, an AFU virtual machine (AFU VM) emulating the AFU invoking the most recent version of AFU logic if the loaded AFU logic is not the most recent version and the AFU is unavailable, and sharing the work queue with the processor and the AFU VM, the work queue directly accessible by the AFU VM and the processor utilizing the same effective addresses.

In yet another embodiment, a method of enabling accelerator functionality in a coherent computer system when an accelerator functional unit (AFU) is unavailable includes loading, with the CAD, AFU logic to the AFU and reading the AFU logic descriptor to determine whether the loaded AFU logic accomplishes a predetermined accelerator function, implementing, with the processor, an AFU virtual machine (AFU VM) emulating the AFU invoking AFU logic that accomplishes the predetermined accelerator function, if the loaded AFU logic does not accomplish the predetermined accelerator function, and sharing the work queue with the processor and the AFU VM, the work queue directly accessible by the AFU VM and the processor utilizing the same effective addresses.

These and other embodiments, features, aspects, and advantages will become better understood with reference to the following description, appended claims, and accompanying drawings.

DETAILED DESCRIPTION

Embodiments of the invention generally enable accelerator functionality in a coherent computer system when the accelerator is unavailable. In embodiments, a virtual or emulated accelerator is provided to carryout accelerator function while the accelerator is unavailable. The emulated accelerator is a functional logical equivalent of the accelerator and is coherent with the system CPU. Thus, the emulated accelerator and CPU both access system memory directly and with the same effective addresses. When the accelerator becomes available, the emulated accelerator is disabled and the accelerator is enabled to allow the accelerator to carryout accelerator functionality.

Figure 1:
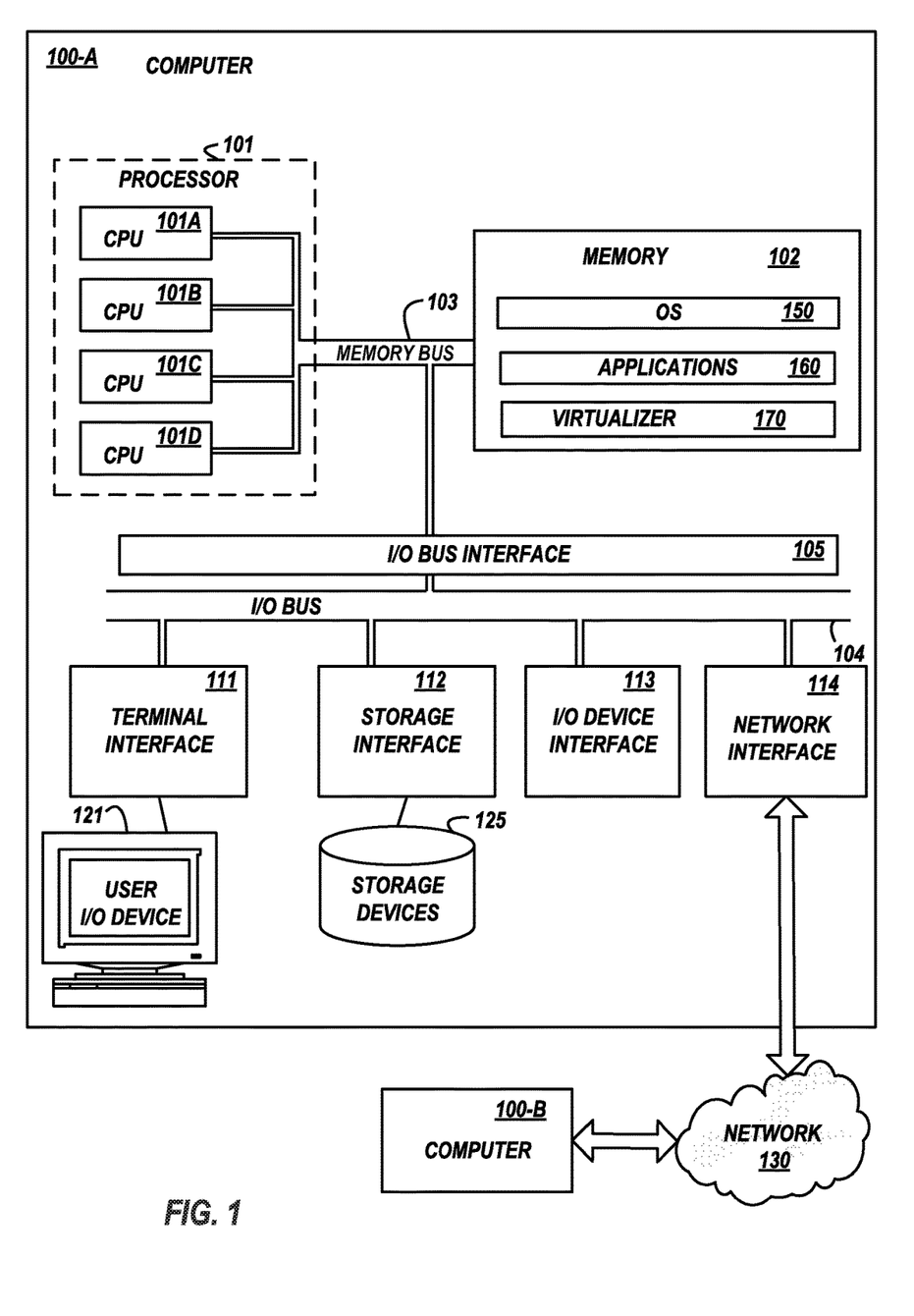
FIG. 1 illustrates a high-level block diagram of an exemplary computer system for implementing various embodiments of the invention.

Referring to the Drawings, wherein like numbers denote like parts throughout the several views, FIG. 1 depicts a high-level block diagram representation of a computer 100-A connected to another computer 100-B via a network 130, according to an embodiment of the present invention. The term "computer" is used herein for convenience only, and in various embodiments is a more general data handling system, such as a mobile phone, tablet, server computer, etc.

The mechanisms and apparatus of embodiments of the present invention apply equally to any appropriate data handling system.

The major components of the computer 100 may comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as the processor 101. In an embodiment, the computer 100 contains multiple processors typical of a relatively large system; however, in another embodiment the computer 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100, and may also include the virtual memory of other computer systems coupled to the computer 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, and/or other program instructions. Although the operating system 150, application 160, etc. are illustrated as being contained within the memory 102 in the computer 100, in other embodiments some or all of them may be on different computer systems and may be accessed remotely, e.g., via the network 130. The computer 100 may use virtual addressing mechanisms that allow the programs of the computer 100 to behave as if they only have access to a large, single storage entity instead of access to multiple, smaller storage entities. Thus, while operating system 150, application 160, or other program instructions are illustrated as being contained within the main memory 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together.

In an embodiment, operating system 150, application 160, and/or other program instructions comprise instructions or statements that execute on the processor 101 or instructions or statements that are interpreted by instructions or statements that execute on the processor 101, to carry out the functions as further described below with reference to FIGs. When such program instructions are able to be run by the processor 101, such computer 100 becomes a particular machine configured to carry out such instructions. For example, instructions for a virtualizer application 170 may be loaded upon one or more computers 100A that causes the computer 100 to virtualize or emulate computer devices or functions. The virtualizer application 170 may be a hypervisor or virtual machine monitor (VMM) that creates and runs virtual or emulated machines.

One or more processors 101 may function as a general-purpose programmable graphics processor unit (GPU) that builds images (e.g. a GUI) for output to a display. The GPU, working in conjunction with one or more applications 160, determines how to manipulate pixels on e.g. display, touch screen, etc. to create a display image or user interface. Ultimately, the image (e.g. GUI, etc.) is displayed to a user. The processor 101 and GPU may be discrete components or may be integrated into a single component.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.). In some embodiments, the computer 100 itself acts as the user interface as the user may move the computer 100 in ways to interact with, input, or manipulate computer application 160 data, function, etc.

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the secondary storage devices 125, as needed. The local secondary storage devices 125 have a slower access time than does the memory 102, meaning that the time needed to read and/or write data from/to the memory 102 is less than the time needed to read and/or write data from/to for the local secondary storage devices 125.

Figure 2:
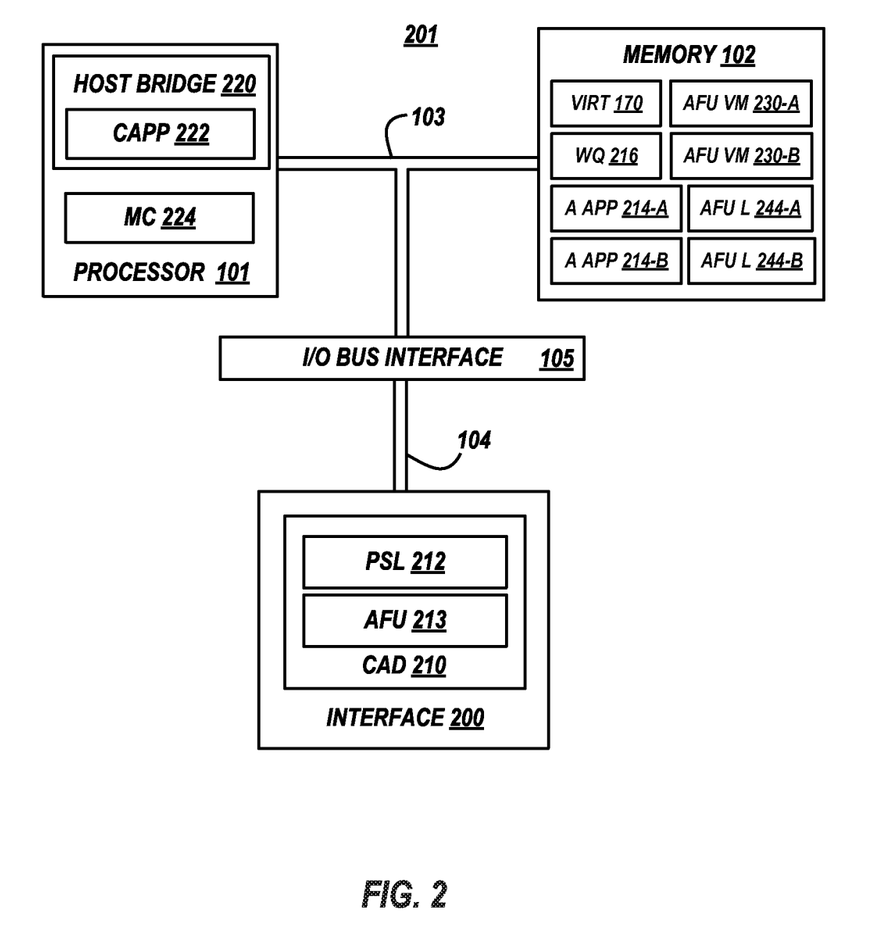
FIG. 2 illustrates a block diagram of an exemplary coherent computer system for implementing various embodiments of the invention.

The I/O device interface 113 provides an interface to any of various other input/output devices or devices of other types, such as printers or fax machines. The network adapter 114 provides one or more communications paths from the computer 100 to other data handling devices such as numerous other computers; such paths may comprise, e.g., one or more networks 130. Although the memory bus 103 is shown in FIG. 2 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface 113 may contain electronic components and logic to adapt or convert data of one protocol on I/O bus 104 to another protocol on another bus. Therefore, I/O interface 113 may connect a wide variety of devices to computer 100 and to each other such as, but not limited to, tape drives, optical drives, printers, disk controllers, other bus adapters, PCI adapters, PCIe adapters, NVLink adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into a similar device.

In various embodiments, the computer 100 is a multi-user mainframe computer system, a single-user system, a server computer, storage system, or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100A and at least the computer 100B. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 2 illustrates a block diagram of an exemplary coherent computer 201. Coherent computer 201 includes processor 101, coherent accelerator device (CAD) 210, and memory 102. Coherent computer 201 may include other components as described with reference to computer 100 illustrated in FIG. 1.

Each processor 101 in coherent computer 201 contains a bus interconnection fabric which enables the one or more cores therein to communicate and coherently share system memory. For example, processor 101 may be connected to memory 102 by bus 103 and processor 101 and memory 102 may be connected to CAD 210 by I/O bus interface 105 via bus 103 and bus 104. For example, the interconnection fabric may be a peripheral component interconnect express (PCIe) topology, NVIDIA® NVLink topology, etc.

Additionally, processor 101 includes a memory controller 224 that controls a discrete memory 102. If coherent computer 201 includes multiple discrete memories 102, processor 101 includes multiple memory controllers 224 associated with respective discrete memories 102. Processor 101 also includes Host Bridge 220 to bridge to multiple interfaces 200 and a Coherent Accelerator Processor Proxy (CAPP) within the Host Bridge 220. The CAPP 222 in connection with Host Bridge 220 are memory coherence, data transfer, interrupt, and address translation agents on the bus interconnection fabric for one or more CADs 210.

CAD 210 is a FPGA or ASIC connected to the processor 101 by the bus interconnection fabric. Each CAD 210 includes a Service Layer (PSL) 212 and one or more Accelerator Function Units (AFUs) 213. CAD 210 is located within interface 200. Interface 200 may be terminal interface 111, storage interface 112, I/O interface 113, or network interface 114. When CAD 210 is located in terminal interface 111, it is a terminal function accelerator, when CAD 210 is located in storage interface 112, it is a storage function accelerator, when CAD 210 is located in I/O interface 113, it is a I/O function accelerator, and when CAD 210 is located in network interface 114, it is a network function accelerator.

The PSL 212 provides the interface to the processor 101. Effective addresses from an AFU 213 are translated to a physical address in system memory 102 by PSL 212. In other words, the PSL 212 provides the translation and interrupt services needed by AFU 213. For example, if the AFU 213 needs to read a particular effective address, it sends that address to PSL 212, the PSL 212 then translates it, fetches the data from memory 102 and returns it to the AFU 213. If the PSL 212 has a translation miss, it interrupts the processor 101 and the processor 101 services the fault.

The AFU 213 is the functional part of the CAD 210 (e.g. the AFU 213 provides the compression, crypto, etc. function). The processor 101 generally has no knowledge of the function of the AFU 213.

The combination of PSL 212, Host Bridge 220, and CAPP222 provide AFUs 213 with several capabilities. AFUs 213 operate on data in memory 102, coherently, as peers of processor 101 in the system 201. AFUs 213 further use effective addresses to reference memory 102, with address translation provided by the PSL 212. The PSL may also generate interrupts on behalf of AFUs 213 to signal AFU 212 completion, or to signal a system service when a translation fault occurs.

CAD 210 can consist of a single chip, a multi-chip module (or modules), or multiple single-chip modules on a system board or other second-level package, such as an adapter connected to the system board by a connector. Each AFU 213 provides hardware acceleration for functions, such as compression, that an application 160 can use for performance improvements. The AFUs 213 can be dedicated to a single application 160 or shared between multiple applications 160. The purpose of an AFU 213 is to provide applications 160 with a higher computational unit density for hardware acceleration of functions to improve the performance of the application 160 and off-load the processor 101. An application 160 requests use of an AFU 213 using a work element descriptor. The work element description contains the full description of the job to be performed or contain pointers to other main memory 112 structures in the Application's 160 memory space. In an embodiment, an AFU 213 may be used by any application 160 or, in other embodiments, an AFU 213 to be dedicated to a single application 160.

The PSL 212 fetches work for an AFU 213 from a work element queue (WQ) 216 located in main memory 102. The WQ 216 is a circular First-In-First-Out (FIFO) buffer with head and tail pointers. The head pointer is the location where the next work queue element is added or enqueued. The tail pointer is the location of the next work queue element to be processed. Work elements are added to the queue by the processor 101 and removed from the queue by PSL 212 or other process assigned to service the WQ 216. The locking mechanism for the head and tail pointers allow for multiple AFUs 213, processes, and applications 160 to service a single WQ 216. Since work elements may be preempted before completing, the PSL 212 can also place partially completed work elements back onto the WQ 216. In order to make sure a PSL 212 always has room in the WQ 216 for the partially completed work elements, the processor 101 must not use more than the maximum number of queue entries minus the number of AFUs 213 servicing the WQ 216. In certain embodiments, when CAD 210 includes multiple AFUs 213, the WQ 216 includes multiple portions, each portion associated with a particular AFU 213. For example, a particular AFU 213-A utilizes a WQ portion 216-A, etc.

In order to provide coherent access to system memory 102, CAPP 222 and PSL 212 may each contain a directory of cache lines used by the AFUs 213. The CAPP 222 may snoop the fabric on behalf of the PSL 212, accesses its local directory, and respond to the fabric with latency that is the same as other caches on CAD 210. In this way, the insertion of an off-chip coherent CAD 210 does not affect critical system performance parameters such as cache snoop latency. Snoops that hit in the CAPP 222 directory may generate messages that are sent to PSL 212 by Host Bridge 220 and the interconnect fabric. The PSL 212 may then respond to the message in a variety of ways depending on the contents of the message.

The PSL 212 may master operations on the interconnect fabric using the combination of the buses, Host Bridge 220, and master read and write finite state machines (FSMs) in CAPP 222. For example, to store into a line on behalf of an AFU 213, the PSL 212 has ownership of the line. The PSL 212 may first check for presence of the line in its cache directory. If the line is present (directory hit) and in the modified state, the PSL 212 allows the store from AFU 213 to proceed. However, if the access misses in the PSL 212 directory, then the PSL 212 initiates a fabric master operation to gain ownership of the line and may further request the cache line data. This may be accomplished by sending a command to a CAPP 222 master read FSM. The CAPP 222 master FSM performs the access on the fabric and ultimately gains ownership of the line and sends a message that it has obtained to the PSL 212. If the data was also requested, it will be directly returned by the source, which could be MC 224 or another cache in the system 201, to the Host Bridge 220 where it is transferred across the interconnect fabric to PSL 212 and installed in its cache. The store from the AFU 213 is then allowed to complete.

To push a line from the PSL 212 cache to memory 102, which may occur for example when a line owned by PSL 212 needs to be evicted to make space for another line in the cache, PSL 212 issues a write command to a CAPP 222 master write FSM. The PSL 212 also pushes the modified data to the Host Bridge 220 for write-back to memory 102, and updates the state for the line in its directory to indicate that it no longer owns the line. The master write FSM obtains routing information for the destination of the write data and passes it to the Host Bridge 220 via sideband signals. The Host Bridge 220 then pushes the data onto the interconnect fabric to the destination. Additionally, the master write FSM updates the CAPP 222 directory to reflect that the line is now invalid.

In the previous example, the combination of evicting a line to make room for a new line and reading the new line, with or without intent to modify the line, were illustrated as separate operations. This common combination between the PSL 212 and CAPP 222 is optimized by providing a single compound operation that both evicts a directory entry, possibly with data push to memory, and loads a new entry into the CAPP 222 directory, possibly with read data provided back to PSL 212. A compound command concurrently activates both write and read FSMs in CAPP 222 to perform the operation. This saves two crossings of the interconnect fabric compared to discrete operations.

The PSL 212 is further provisioned with the capability to master reads and writes on the fabric to copy lines to outside of the coherence domain as would be the case of an I/O device operating with a checkout model of memory 102. This provision allows AFUs 213, with no need to maintain coherent copies of lines, to entirely bypass the PSL 212 and CAPP 222 caches.

To enable AFUs to reference memory 102 with effective addresses, as would an application 160 running on a processor 101 core, the PSL 212 may contain a memory management unit (MMU) comprising table-walk machines to perform address translations and caches of recent translations, thereby frequently avoiding table walks. Table-walk machines use the mechanisms described above to read and update tables in memory 102 during the translation process.

Since the PSL 212 contains a translation cache, it may participate in translation invalidation operations on the interconnect fabric. The CAPP 222 may snoop the invalidation operations on behalf of the PSL 212 and sends them in messages to the PSL 212, either one at a time or bundled into groups. The PSL 212 looks up the address presented by the invalidation operations in its caches. If the address misses, it responds immediately back to the CAPP 222 snooper that the invalidation operation is complete. If the invalidation operations hits, the PSL 212 follows a protocol to ensure all storage operations associated with that translation cache entry are completed before sending a completion message to the CAPP 222 snooper.

Address translations may generate faults requiring notification of system software to repair the fault. For this and other needs, the PSL 212 may provide signal interrupts to software. This may be accomplished by using a message signaled interrupt (MSI) mechanism provided by the Host Bridge 220. The PSL 212 sends a command to the Host Bridge 220 using a particular address and data value indicative of the particular interrupt being asserted.

The CAPP 222 may be divided into three areas: machines and transport, snoop pipeline, and interconnect fabric interface. The interconnect fabric interface provides snooper, master, and data interfaces to the interconnect fabric. The snooper interface comprises a reflected command (rcmd) bus and partial response buses (presp). A command issued by a master may be broadcast to the interconnect fabric on a command/address (cmd/addr) bus and may enter the CAPP 222 snoop pipeline on its rcmd bus. The snooped reflected command may be decoded, and if it is not supported, it proceeds no further down the pipeline. If the snooped reflected command is supported, has an address, and requires a CAPP 222 directory lookup, arbitration for read access to the directory may occur in the next pipeline phase. Master FSMs, snoop FSMs, and snooped reflected commands may arbitrate for read access to the directory. Having won arbitration, the snooped reflected command may read the directory, and the result may be a cache hit or miss. The address may also be compared to addresses held by master and snoop FSMs to see if any are already performing an action on the address. Depending on the outcome, the snoop control logic may determine the next action. This may include dispatching to one of the snoop FSMs when, for example, the CAPP 222 owns the line in a modified state, and another master is requesting ownership of the line. A snoop FSM may be required to change the CAPP 222 directory state, in which case it must arbitrate for write access to the directory.

Generally, a snooped reflected command that proceeds to this point may need a partial response (presp) on the interconnect fabric to indicate the state of affairs in the CAPP 222 back to a fabric controller. A presp appropriate to the reflected command and the state of the cache line in the CAPP 222 may be formed by the presp logic and issued on the presp bus. The fabric controller combines all presps and returns a combined response (cresp) to all agents on the bus so they may see the final results of the operation and act accordingly.

The action may also include sending a message to the PSL 212 that is descriptive of the snooped reflected command, the CAPP 222 state, and any actions the CAPP took on behalf of the PSL 212. The PSL 212 may then take further actions in response to the message, as in the line push example where data needs to be written back to memory 102. Messages to the PSL 212 from both master and snoop FSMs may be queued and packed into fabric data packets by a command/message transport block and pushed on to the fabric data_out bus to the Host Bridge 220. The Host Bridge 220 may perform a write to transmit the message packet to the PSL 212.

To master a command on the fabric cmWaddr bus, the PSL 212 may select one master read FSM or master write FSM, or a pair of FSMs in the case of compound operations, to master the command. PLS 212 may form a command packet containing details of the operation for the FSM to perform. Multiple commands to multiple FSMs may be packed into a single command packet. The PSL 212 may issue a write packet to transmit the command packet to the Host Bridge 220. The Host Bridge 220 may decode address bits in the packet to learn that it is a command packet to be pushed toward the CAPP 222 on its fabric data_out bus. The packet may arrive on the CAPP fabric data_in bus, is received and unpacked by the command/message transport logic, and distributed to the appropriate master FSMs.

Upon receiving a command, a master FSM may then sequences through steps that may include a CAPP 222 directory look-up, cross-checking an address against snoop FSMs, issuing the command on the fabric cmWaddr bus, receiving and acting on a cresp, updating the directory state, and sending a message to the PSL 212. Consider the line push example described previously. The line may be held in the PSL 212 and CAPP 222 directories in the modified state. The PSL 212 may issue a command to the CAPP 222 master write FSM to evict the line from the directory, i.e., move the line from the modified to invalid state. Master write FSM may activate, arbitrate for the snoop pipeline, looks the line up in the CAPP directory, obtain the memory address of the line from the directory entry, and enter a line protection state where any snoops that hit the line will be retried, i.e., a retry response is issued on the presp bus. The master FSM may issue a push command and address on the cmWaddr bus and wait for the cresp. Assume a particular memory controller 224 responds as owning the memory address of the line. The cresp contains information for routing the data to the memory controller. Master FSM may send this routing information to the Host Bridge 220 via a Host Bridge 220 sideband interface so that when the data packet containing the modified cache line arrives from the PSL 212, the Host Bridge 220 may push the line on its data_out bus directly to that particular memory controller 224. Master FSM may also arbitrate to update the CAPP directory entry state to invalid and may send a message to the PSL 212 containing the requisite information so that PSL 212 may update its directory properly and push out the modified data.

Master read operations may proceed similarly, but in the case of reads, data from a source memory controller 224 or another cache in the system is to be returned to the PSL 212. The CAPP 222 master read FSM selected for the operation may provide routing information so that the data may be returned directly from the source to the Host Bridge 220 and on to the PSL 212 over the interconnect fabric.

The interrupt operations discussed previously are another form of reflected commands that the CAPP 222 snoops. A snooped interrupt operation may generate a message to be sent to the PSL 212, and after performing the actions described previously, the PSL 212 may return a response to the CAPP 222. The command/message transport logic may send interrupt operation responses to the interrupt operations snoop logic where appropriate action may be taken.

Memory 102 may further include an accelerated application 214, a AFU virtual machine (AFU VM) 230, and AFU Logic 244. Accelerated application 214 and AFU VM 230 are program instructions that comprise instructions or statements that execute on the processor 101 or instructions or statements that are interpreted by instructions or statements that execute on the processor 101, to carry out the functions as further described below with reference to FIGs. AFU Logic 244 are program instructions that comprise instructions or statements that execute on the CAD 210 or instructions or statements that are interpreted by instructions or statements that execute on the CAD 210, to carry out the functions as further described below with reference to FIGs.

Accelerated application 214 is a particular application 160 called and run by processor 101 that is coherent and associated with accelerator functionality carried out by CAD 210 or by AFU VM 230. For example, a first accelerated application 214-A may cause the processor 101 to accomplish a first task, process, function, etc. and is associated with a first WQ 214-A portion coherently shared with a first AFU 213-A implementing first AFU Logic 244-A that accelerates the first task, process, function, etc. Likewise, a second accelerated application 214-B may cause the processor 101 to accomplish a second task, process, function, etc. and is associated with a second WQ 214-B portion coherently shared with a second AFU 213-B implementing second AFU Logic 244-B that accelerates the second task, process, function, etc.

AFU logic 244 is the accelerator logic called and run by the AFU 213 to accomplish accelerator functionality carried out by CAD 210. For example, the first AFU 214-A may call and run first AFU logic 244-A causing CAD 210 to accelerate the encryption of data. Similarly, the second AFU 214-B may call and run second AFU logic 244-B causing CAD 210 to accelerate the compression of data.

AFU VM 230 is a virtualized or emulated AFU provided by virtualizer 170. AFU VM 230 is a software implementation of a CAD 210 implementing a particular AFU accelerator function. For example, a first AFU VM 230-A may be called and run by processor 101 to provide the accelerator function associated with the first AFU 213-A when the first AFU 213-A is unavailable. Likewise, a second AFU VM 230-B may be called and run by processor 101 to provide the accelerator function associated with the second AFU 213-B when the second AFU 213-B is unavailable.

Figure 3:
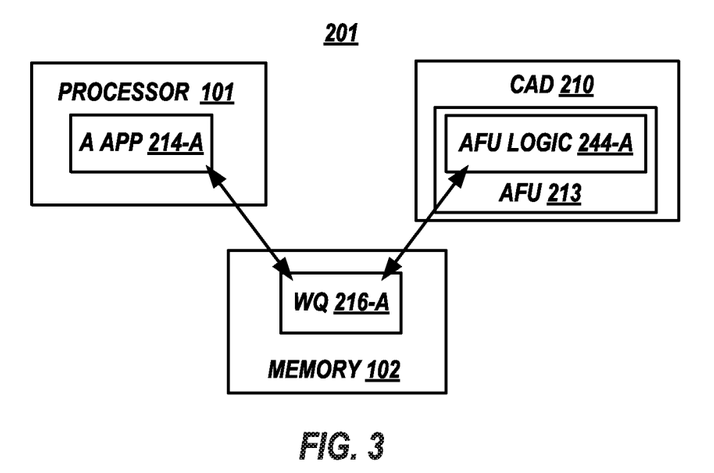
FIG. 3-FIG. 7 illustrates a block diagram of an exemplary coherent computer system implementing various embodiments of the invention.

FIG. 3 illustrates coherent computer system 201 including processor 101 and CAD 210 sharing a WQ portion 216-A when AFU 213 is available and running. The CAD 210 includes a first AFU 213-A implementing AFU logic 244-A to cause the CAD 210 to accomplish accelerated functions (e.g. compression, encryption, decompression, decryption, etc.) offloaded by the processor 101 running an accelerated application 214-A in a manner consistent with the above detailed description.

Figure 4:
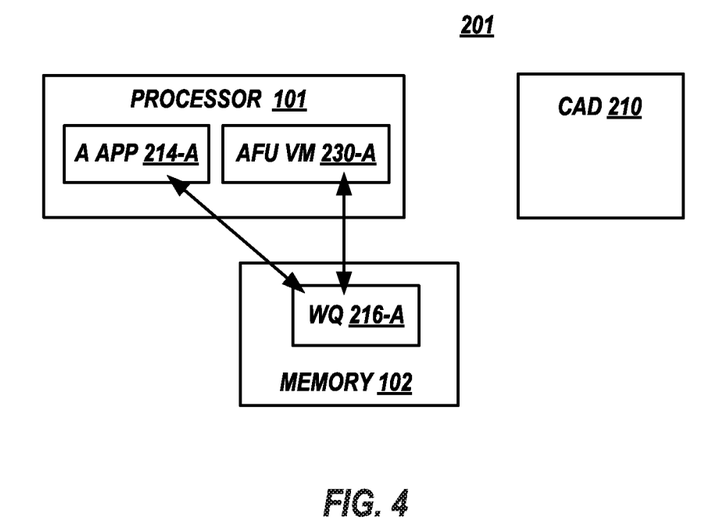

FIG. 4 illustrates coherent computer system 201 including processor 101 and CAD 210 sharing WQ portion 216-A when AFU 213 is not available. AFU VM 230-A created by virtualizer 170 is invoked by processor 101 to cause the AFU VM 230-A to accomplish accelerated functions offloaded by the processor 101 running the accelerated application 214-A. In other words, the processor 101 is running accelerated application 214-A and the AFU VM 230-A implemented by the processor 101 accomplishes the accelerated functions that are otherwise to be provided by AFU 213-A when available. Thus, the processor 101 temporality provides the accelerated functionality when the AFU 213-A is unavailable.

Figure 5:
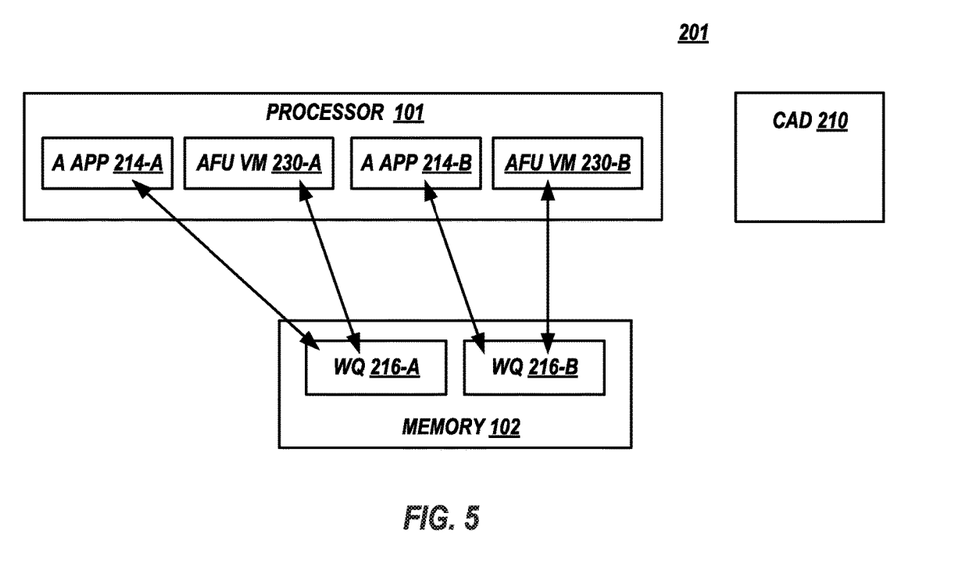
Figure 6:
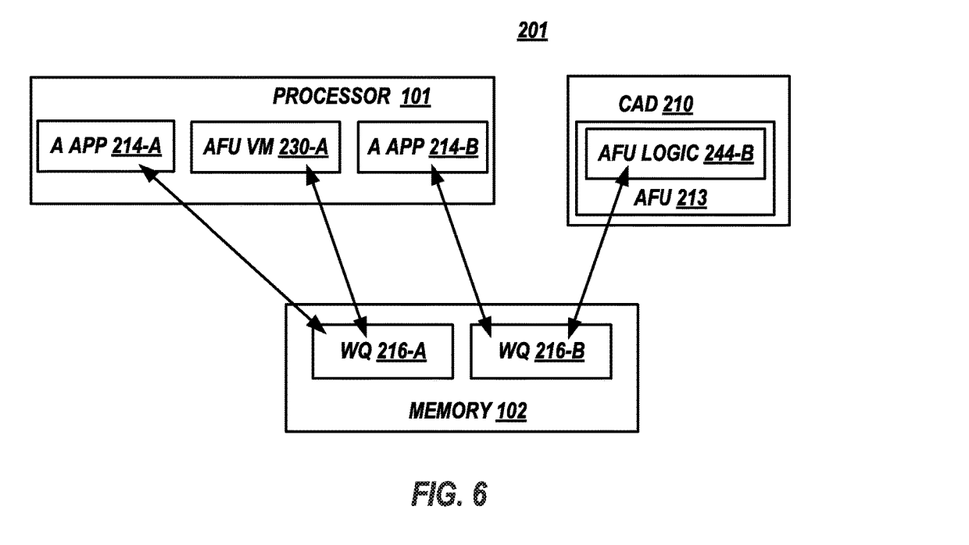
Figure 7:
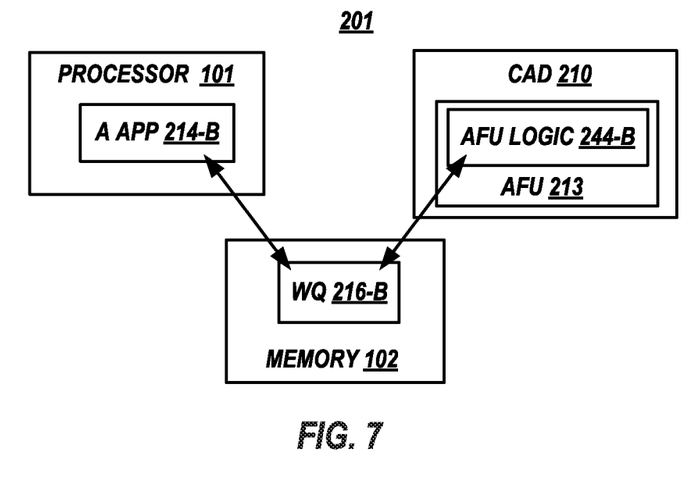

FIG. 5-FIG. 7 illustrates an exemplary stages of enabling accelerator functionality in a coherent computer system 201 when the processor 101 is transitioning from implementing a first process defined by accelerated application 214-A to implementing a second process defined by accelerated application 214-B. The transition process may initially appear as in FIG. 3, in which the CAD 210 includes the first AFU 213-A implementing AFU logic 244-A to cause the CAD 210 to accomplish accelerated functions offloaded by the processor 101 running an accelerated application 214-A. In response to receiving a command to stop accelerated application 214-A and implement accelerated application 214-B, the processor 101 disables AFU 213-A and invokes AFU VM 230-A to accomplish any remaining accelerated functions that were otherwise to be provided by AFU 213-A. Further, in response to receiving the command to stop accelerated application 214-A and implement accelerated application 214-B, the processor 101 invokes AFU VM 230-B to accomplish accelerated functions that are otherwise to be provided by AFU 213-B prior to AFU 213-B being ready for utilization. Further, in response to receiving the command to stop accelerated application 214-A and implement accelerated application 214-B, processor 101 directs CAD 210 to create or otherwise prepare AFU 213-B.

During this transition the first process defined by accelerated application 214-A is coherently sharing the first WQ portion 216-A initially with AFU 213-A and subsequently with AFU VM 230-A until the first process is completed and the WQ portion 216-A is empty. Simultaneously, as is shown in FIG. 5, the second process defined by accelerated application 214-B is coherently sharing the second WQ portion 216-B with AFU VM 230-B.

FIG. 6 depicts the subsequent stage in the transition from implementing the first process defined by accelerated application 214-A to implementing a second process defined by accelerated application 214-B when the CAD 210 has created or otherwise prepared AFU 213-B for utilization. In response to AFU 213-B being enabled for utilization, the processor disables the AFU VM 230-B. As such, at the present stage in the transition, the second process defined by accelerated application 214-B is coherently sharing the second WQ portion 216-B with AFU 244-B. Further, at the present stage in the transition, WQ portion 216-A may still not be empty as the accelerated application 214-A may still be coherently sharing the first WQ portion 216-A with AFU 213-A or with AFU VM 230-A.

FIG. 7 depicts the subsequent stage in the transition from implementing the first process defined by accelerated application 214-A to implementing a second process defined by accelerated application 214-B. At the present stage of transition, WQ portion 216-A has become empty and the processor disables or otherwise ends the first process defined by accelerated application 214-A and disables the AFU VM 230-A. Further, at the present stage of transition, the accelerated application 214-B is operating and coherently sharing the second WQ portion 216-B with AFU 213-B.

Figure 8:
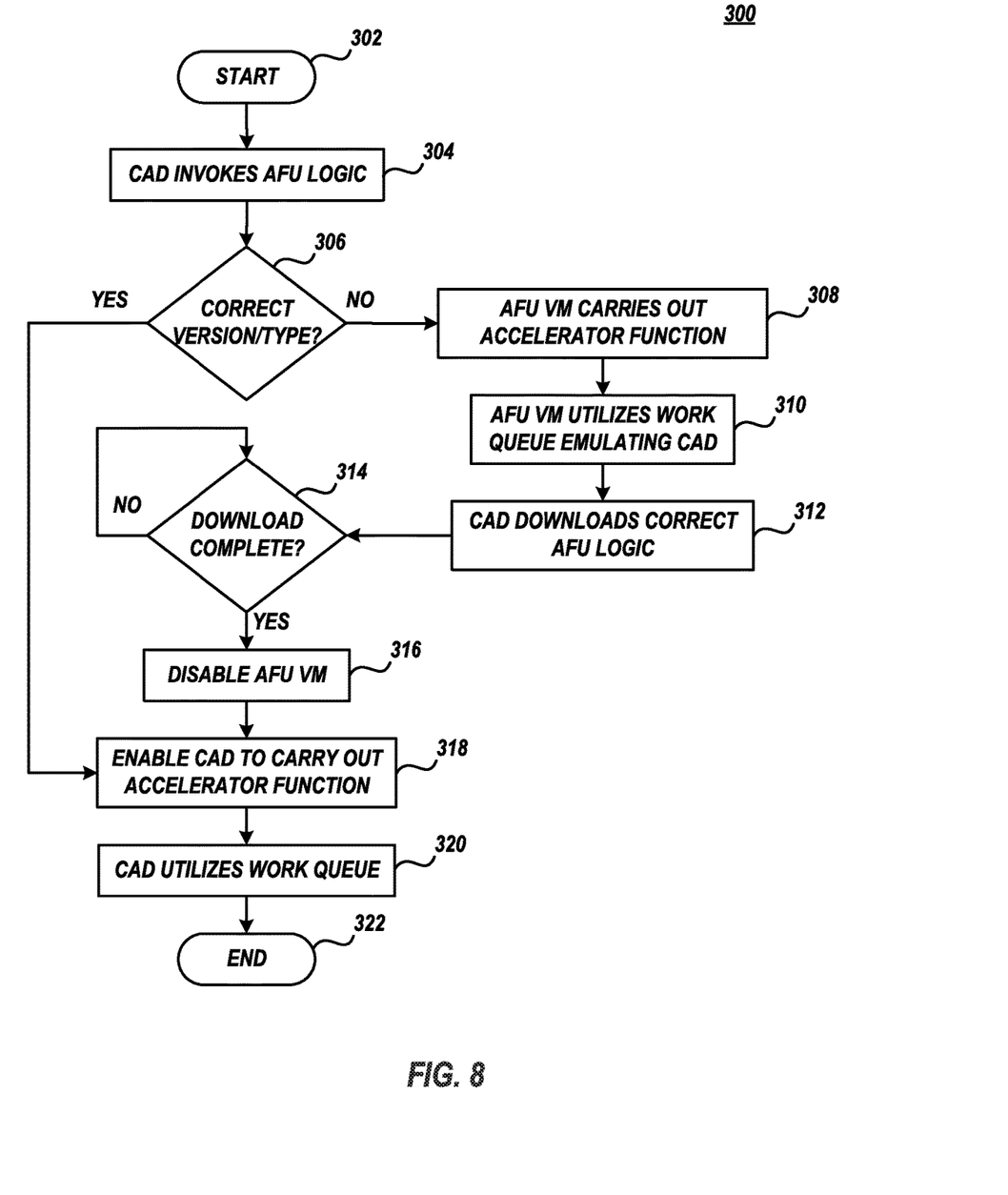
FIG. 8 illustrates an exemplary method of enabling accelerator functionality in a coherent computer system when the accelerator is unavailable, according to various embodiments of the present invention.

FIG. 8 illustrates an exemplary method 300 of enabling accelerator functionality in a coherent computer system 201 when the associated AFU 213 is unavailable. Method 300 may be utilized by computer 201 to provide accelerator function whilst the AFU 213 associated with the accelerator function is unavailable. Method 300 may be stored upon memory 102 and evoked by processor 101 to cause the processor and/or the CAD 210 to functionally implement one or more of the various blocks of process 300.

Process 300 begins at block 302 and continues with CAD 210 receiving a command to invoke AFU logic 244 to carry out an associated accelerator function (block 304). For example, CAD 210 loads the AFU logic 244 and reads an AFU logic 244 descriptor to determine the version of the AFU logic 244 and/or type of accelerator function provided by the AFU logic 244.

Process 300 may continue with processor 101 or CAD 210 determining if the called, installed, present, etc. AFU logic 244 is the correct version or whether the AFU logic 244 is the correct type (block 306). For example, the processor 101 may determine the present AFU logic 244 is down level and a most recent version of the AFU logic 244 is available and should be utilized. In another example, the processor 101 may determine that the present AFU logic 244 is associated with an improper accelerator function. For example, processor 101 may determine the present AFU logic 244-A is associated with compression functions and has been improperly loaded while the proper AFU logic 244-B associated with encryption functions should be loaded.

If the invoked AFU logic 244 is determined at block 306 to be the correct version or the correct type, the processor 101 enables CAD 210 to carry out the AFU logic 244 within the AFU 213 to accomplish the accelerator function associated therewith (block 318). If the invoked AFU logic 244 is determined at block 306 not to be the correct version or the correct type, the processor 101 enables AFU VM 230 to carry out the accelerator function associated with the correct AFU logic 244 (block 308). For example, virtualizer 170 may create and implement the AFU VM 230 upon the processor 101 emulating the AFU 213 implementing the correct AFU logic 244 to accomplish the accelerator function associated therewith.

Method 300 may continue with the AFU VM 230 utilizing WQ 216 emulating the AFU 213 implementing the correct AFU logic 244 to accomplish the accelerator function associated therewith (block 310). In other words, the processor 101 invoking accelerated application 214 and the AFU VM 230 coherently share the WQ 216 just as the AFU 213 implementing the correct AFU logic 244 would coherently share the WQ 216 with processor 101.

Method 300 may continue with CAD 210 loading the correct AFU logic 244. For example, CAD 210 may load the correct AFU logic 244 from a library of AFU logic 244 modules stored locally in memory 102. In another example, the processor 101 may retrieve the correct AFU logic 244 from a network 130 attached computer 100 and pass the retrieved AFU logic 244 to the CAD 210.

Method 300 may continue with the processor 101 or the CAD 210 determining if the loading of the correct AFU logic 244 to the appropriate AFU 213 within CAD 210 is complete (block 314). If the loading of the correct AFU logic 244 to the appropriate AFU 213 within CAD 210 is complete at block 314, the processor 101 disables the AFU VM 230 (block 316). For example, virtualizer 170 ends the implementation of the AFU VM 230. Method 300 may continue by processor 101 or CAD 210 enabling the AFU 213 to run the correct AFU logic 244 to accomplish the accelerator function associated therewith (block 318).

Method 300 may continue with the AFU 213 within CAD utilizing WQ 216 to accomplish the accelerator function associated therewith (block 320). In other words, the CAD 210 implements the correct AFU logic 244 and coherently shares the WQ 216 with processor 101 implementing the accelerated application 214. Method ends at block 322.

Figure 9:
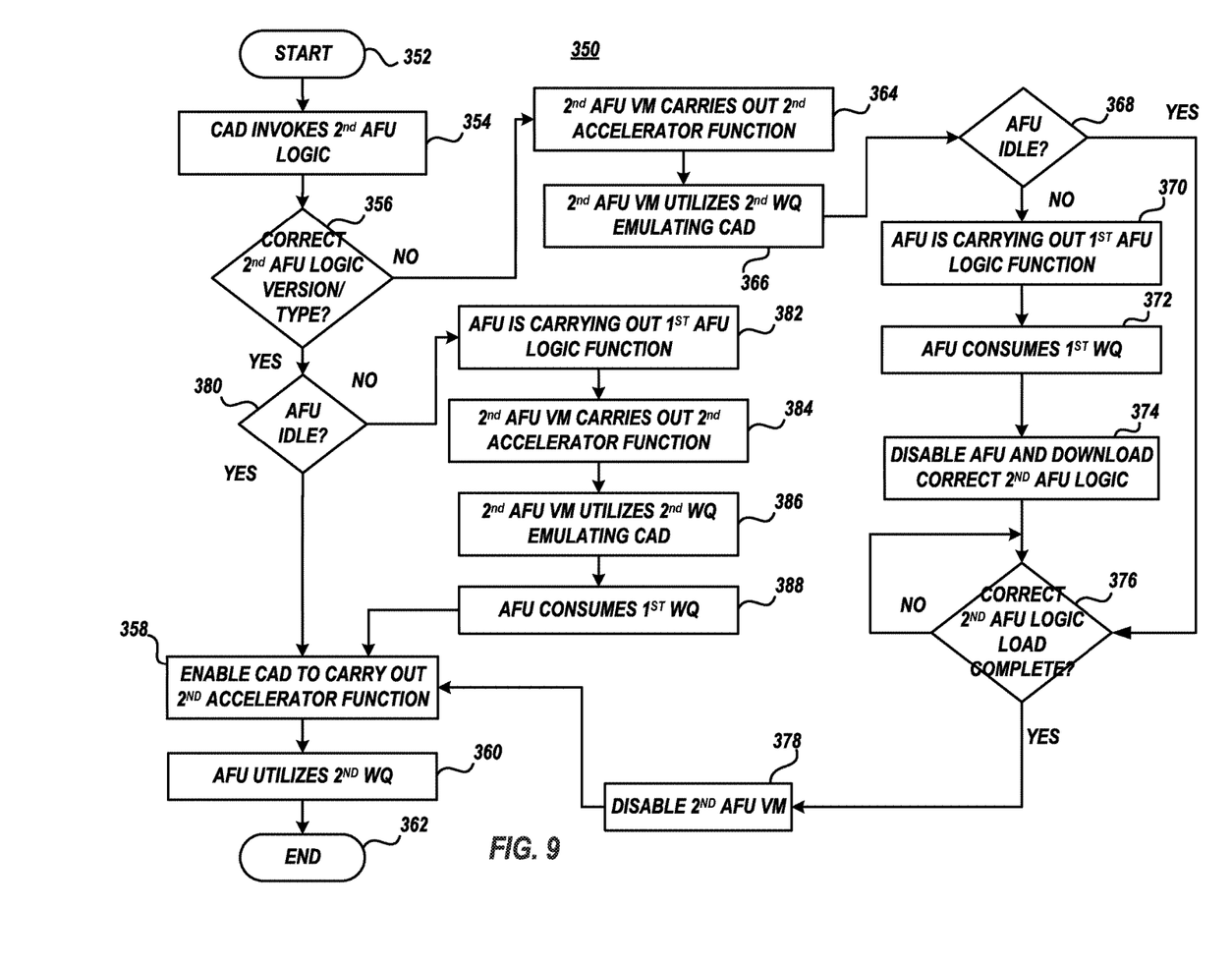
FIG. 9 illustrates an exemplary method of enabling accelerator functionality in a coherent computer system when the accelerator is unavailable, according to various embodiments of the present invention.

FIG. 9 illustrates an exemplary method 350 of enabling accelerator functionality in a coherent computer system 201 when the AFU 213 is unavailable due to transitioning from implementing first AFU logic 244-A to implementing second AFU logic 244-B. For example, the AFU 213 may become unavailable when transition from a compression function AFU logic 244-A to a encryption AFU logic 244-B. Method 350 may be utilized by computer 201 to provide accelerator function by the processor 101 implementing an AFU VM 230 whilst the AFU 213 is unavailable. Method 350 may be stored upon memory 102 and evoked by processor 101 to cause the processor 101 and/or the CAD 210 to functionally implement one or more of the various blocks of process 350.

Process 350 begins at block 352 and continues with CAD 210 receiving a command to invoke a second AFU logic 244-B within an AFU 213 to carry out an associated second accelerator function (block 354). For example, CAD 210 loads the AFU logic 244-B and reads an AFU logic 244-B descriptor to determine the version of the AFU logic 244-B and/or type of accelerator function provided by the AFU logic 244-B.

Method 350 may continue with processor 101 or CAD 210 determining if the second AFU logic 244-B is the correct version or whether the second AFU logic 244-B is associated with the correct accelerator function (block 356). For example, the processor 101 may determine the second AFU logic 244-B is down level and a most recent version of the AFU logic 244-B is available and should be utilized. In another example, the processor 101 may determine that the second AFU logic 244-B is associated with an improper accelerator function. For example, processor 101 may determine the present AFU logic 244-B is associated with compression functions and has been improperly invoked while the proper AFU logic 244-B should be associated with encryption functions should be installed and utilized by the AFU 213.

If the second AFU logic 244-B is the correct version or the second AFU logic 244-B is associated with the correct accelerator function as determined at block 356, method 350 may continue by the processor 101 or the CAD 210 determining if the AFU 213 is idle (block 380). In other words, the processor 101 or the CAD 210 determines if the AFU 213 is still processing data associated with the first AFU logic 244-A within AFU 213. If AFU 213 is idle, the AFU 213 and first AFU logic 244-A there within has completed processing of data and no data associated with the AFU logic 244-A is within WQ 216-A. As such, method 350 may continue by the processor 101 or CAD 210 enabling the AFU 213 to run the AFU logic 244-B to carry out the accelerator function associated therewith (block 358). Method 350 may continue with the AFU 213 utilizing WQ 216-B to accomplish the accelerator function associated therewith (block 360). In other words, the CAD 210 implements the correct AFU logic 244-B and coherently shares the WQ 216-B with processor 101 implementing the accelerated application 214.

If the processor 101 or the CAD 210 determines the AFU 213 is not idle at block 380 the AFU 213 and first AFU logic 244-A there within have not completed processing of data and data associated with the AFU logic 244-A is within WQ 216-A (block 382). As such, method 350 may continue by the processor 101 enabling AFU VM 230-B to carry out the accelerator function associated with the AFU logic 244-B (block 384). For example, virtualizer 170 may create and implement the AFU VM 230-B upon the processor 101 emulating the AFU 213 implementing the AFU logic 244-B to accomplish the accelerator function associated therewith. Method 350 may continue with the AFU VM 230-B utilizing WQ 216-B emulating the AFU 213 implementing the AFU logic 244-B to accomplish the accelerator function associated therewith (block 386). In other words, the processor 101 invoking accelerated application 214 and the AFU VM 230-B coherently share the WQ 216-B just as the AFU 213 implementing the AFU logic 244-B would coherently share the WQ 216 with processor 101. Method 350 may continue by the CAD 210 and the processor 101 finishing processing associated with the AFU 213 and the first AFU logic 244-A there within by consuming the WQ 216-A (block 388). Subsequent to the AFU 213 and the first AFU logic 244-A therewith consuming the WQ 216-A, method 350 may continue to with processor 101 disabling the AFU VM 230-B and enabling the AFU 213 within CAD 210 to carry out AFU logic 244-B to accomplish the accelerator function associated there with as described in block 358.

If the second AFU logic 244-B is not the correct version or the second AFU logic 244-B is associated with the incorrect accelerator function as determined at block 356, method 350 may continue by the processor 101 enabling AFU VM 230-B to carry out the accelerator function associated with the correct AFU logic 244-B (block 364). For example, virtualizer 170 may create and implement the AFU VM 230-B upon the processor 101 emulating the AFU 213 implementing the correct AFU logic 244-B to accomplish the accelerator function associated therewith. Method 350 may continue with the AFU VM 230-B utilizing WQ 216-B emulating the AFU 213 implementing the AFU logic 244-B to accomplish the accelerator function associated therewith (block 386). In other words, the processor 101 invoking accelerated application 214 and the AFU VM 230-B coherently share the WQ 216-B just as the AFU 213 implementing the AFU logic 244-B would coherently share the WQ 216 with processor 101.

Method 350 may continue by the processor 101 or the CAD 210 determining if the AFU 213 is idle (block 368). In other words, the processor 101 or the CAD 210 determines if the AFU 213 is still processing data associated with the first AFU logic 244-A within AFU 213. If AFU 213 is idle, the AFU 213 and first AFU logic 244-A there within has completed processing of data and no data associated with the AFU logic 244-A is within WQ 216-A. As such, method 350 may continue by downloading the correct AFU logic 244-B and ensuring that the loading of the correct AFU logic 244-B within AFU 213 has completed (block 376). Method 350 may continue with disabling the AFU VM 230-B (block 378). For example, virtualizer 170 ends the implementation of the AFU VM 230-B. Method 350 may continue by processor 101 or CAD 210 enabling the AFU 213 to run the correct AFU logic 244-B to accomplish the accelerator function associated therewith at block 358.

If the processor 101 or the CAD 210 determines the AFU 213 is not idle at block 368, the AFU 213 and first AFU logic 244-A there within have not completed processing of data and data associated with the AFU logic 244-A is within WQ 216-A (block 370). Method 350 may continue by the CAD 210 and the processor 101 finishing processing associated with the AFU 213 and the first AFU logic 244-A there within by consuming the WQ 216-A (block 372). Subsequent to the AFU 213 and the first AFU logic 244-A therewith consuming the WQ 216-A, method 350 may continue to with processor 101 disabling the AFU VM 230-B and loading the AFU 213 within CAD 210 to carry out the correct AFU logic 244-B to accomplish the accelerator function associated there with (block 374). Once the loading of the correct AFU logic 244-B is complete, method 350 may continue by proceeding to block 378. Method 350 ends at block 362.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A coherent computer system comprising:
a memory shared by a processor and a coherent accelerator device (CAD), the memory comprising a work queue directly accessible by the CAD and the processor utilizing the same effective addresses;
the CAD comprising:
an accelerator functional unit (AFU) circuit and associated AFU logic to process data from the work queue to accomplish an accelerated function; and
a version detector circuit and associated version detector logic to determine whether the AFU logic is the most recent version, and;
the processor comprising an application and a CAD virtual machine (CAD VM) emulating the CAD while the CAD is unavailable due to the CAD retrieving AFU logic that is the most recent version, the work queue directly accessible by the CAD VM and the processor utilizing the same effective addresses.

2. The coherent computer system of claim 1, wherein the CAD comprises:
an accelerator functional unit (AFU) circuit and associated AFU logic to processes data from the work queue to accomplish an accelerated function, and;
an accelerated function type circuit and associated accelerated function type logic to determine whether the AFU logic accomplishes a predetermined correct accelerated function.

3. The coherent computer system of claim 1, wherein the processor further comprises:
a virtualizer that creates and implements the CAD VM.

4. The coherent computer system of claim 1, wherein the CAD is a field programmable gate array (FPGA).

5. The coherent computer system of claim 4, wherein the FPGA is connected to the processor via a peripheral component interconnect express (PCIe) bus.

6. A coherent computer system comprising:
a memory shared by a processor and a coherent accelerator device (CAD), the memory comprising a work queue directly accessible by the CAD and the processor utilizing the same effective addresses;
the CAD comprising:
an accelerator functional unit (AFU) circuit and associated AFU logic to process data from the work queue to accomplish an accelerated function; and
a version detector circuit and associated version detector logic to determine whether the AFU logic is the most recent version, and;
the processor comprising an application and a CAD virtual machine (CAD VM) emulating the CAD while the CAD is unavailable due to the CAD retrieving AFU logic that accomplishes the predetermined correct accelerated function, the work queue directly accessible by the CAD VM and the processor utilizing the same effective addresses.

7. The coherent computer system of claim 6, wherein the CAD comprises:
an accelerator functional unit (AFU) circuit and associated AFU logic to processes data from the work queue to accomplish an accelerated function, and;
an accelerated function type circuit and associated accelerated function type logic to determine whether the AFU logic accomplishes a predetermined correct accelerated function.

8. The coherent computer system of claim 6, wherein the processor further comprises:
a virtualizer that creates and implements the CAD VM.

9. The coherent computer system of claim 6, wherein the CAD is a field programmable gate array (FPGA).

10. The coherent computer system of claim 9, wherein the FPGA is connected to the processor via a peripheral component interconnect express (PCIe) bus.

* * * * *